US012275251B2

(12) United States Patent
Watanabe et al.

(10) Patent No.: US 12,275,251 B2
(45) Date of Patent: Apr. 15, 2025

(54) TANK UNIT, HEAD SYSTEM, INK SUPPLYING SYSTEM, PRINTING SYSTEM AND PRINTING METHOD

(71) Applicant: BROTHER KOGYO KABUSHIKI KAISHA, Nagoya (JP)

(72) Inventors: Kohei Watanabe, Nagoya (JP); Yuanyuan Deng, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 231 days.

(21) Appl. No.: 18/060,383

(22) Filed: Nov. 30, 2022

(65) Prior Publication Data

US 2023/0173819 A1 Jun. 8, 2023

(30) Foreign Application Priority Data

Dec. 3, 2021 (JP) ................................. 2021-197300

(51) Int. Cl.
*B41J 2/175* (2006.01)

(52) U.S. Cl.
CPC ....... *B41J 2/17513* (2013.01); *B41J 2/17523* (2013.01); *B41J 2/1753* (2013.01); *B41J 2/17546* (2013.01); *B41J 2/17553* (2013.01); *B41J 2/17566* (2013.01)

(58) Field of Classification Search
CPC .. B41J 2/17513; B41J 2/17523; B41J 2/1753; B41J 2/17546; B41J 2/17553; B41J 2/17566
See application file for complete search history.

(56) References Cited

U.S. PATENT DOCUMENTS

| | | | | |
|---|---|---|---|---|
| 10,112,399 | B2 | 10/2018 | Kudo et al. | |
| 10,195,860 | B2 * | 2/2019 | Kimura | B41J 2/17566 |
| 10,479,095 | B2 | 11/2019 | Kobayashi et al. | |
| 10,479,098 | B2 | 11/2019 | Shirono et al. | |
| 2018/0072062 | A1 | 3/2018 | Shindo | |
| 2018/0111377 | A1 | 4/2018 | Kimura et al. | |

FOREIGN PATENT DOCUMENTS

| | | |
|---|---|---|
| JP | 2010-058282 A | 3/2010 |

OTHER PUBLICATIONS

European Patent Office, Extended European Search Report issued in European Patent Application No. 22210530.6, mailed Apr. 20, 2023.

* cited by examiner

*Primary Examiner* — Geoffrey S Mruk
(74) *Attorney, Agent, or Firm* — Baker Botts L.L.P.

(57) ABSTRACT

A tank unit includes: a first bottom wall; a second bottom wall positioned above the first bottom wall and defining an opening penetrating in a vertical direction; a first side wall connected to the first and second bottom walls; a tank arranged on an upper surface of the first bottom wall; a liquid level sensor detecting a liquid level of ink inside the tank; a substrate electrically connected to the liquid level sensor; a first internal wiring having one end connected to the substrate; a first internal tube having one end connected to the tank; a first electric interface which is positioned inside the opening and to which the other end of the first internal wiring is connected; and a first fluidic interface positioned inside the opening, and to which the other end of the first internal tube is connected.

18 Claims, 5 Drawing Sheets

TANK UNIT, HEAD SYSTEM, INK SUPPLYING SYSTEM, PRINTING SYSTEM AND PRINTING METHOD

REFERENCE TO RELATED APPLICATIONS

This application claims priority from Japanese Patent Application No. 2021-197300 filed on Dec. 3, 2021. The entire content of the priority application is incorporated herein by reference.

BACKGROUND ART

Conventionally, there is known an ink-jet printer provided with a controller, a print driving part electrically connected to the controller, and a print head electrically connected to the print driving part. For example, in the ink-jet printer, the controller and the print driving part are connected by a cable, and the print driving part and the print head are connected by another cable.

DESCRIPTION

In the ink-jet printer, a direction in which the cable connecting the controller and the print driving part extends crosses a direction in which the another cable connecting the print driving part and the print head extends. Due to this, in a case of installing or arranging the print driving part, it is necessary to secure not only a space for the print driving part, but also a space in each of the direction in which one of the cables extends, which in turn leads to such a problem that a placement (arrangement) location of the print driving part is restricted.

The present teaching has been made in view of the above-described problems, and an object of the present teaching is to improve the degree of freedom of the placement location of a tank unit relaying a head unit and a base unit. Further, another object of the present teaching is to provide a head system, an ink supplying system, a printing system and a printing method each provided with such a tank unit.

According to a first aspect of the present teaching, there is provided a tank unit including:

- a first bottom wall spreading in a first direction and a second direction, the first direction being along a horizontal plane, the second direction being along the horizontal plane and crossing the first direction;
- a second bottom wall positioned above the first bottom wall and spreading in the first direction and the second direction, the second bottom wall defining an opening penetrating therethrough in a vertical direction;
- a first side wall spreading in the vertical direction and the second direction, the first side wall having an upper end part and a lower end part, the upper end part being connected to an end part on one side in the first direction of the second bottom wall, the lower end part being connected to an end part on the other side in the first direction of the first bottom wall;
- a tank arranged on an upper surface of the first bottom wall and which is configured to store ink;
- a liquid level sensor configured to detect a liquid level of the ink inside the tank;
- a substrate electrically connected to the liquid level sensor;
- a first internal wiring having one end connected to the substrate;

- a first internal tube which has one end connected to the tank and through which the ink to be supplied to the tank flows;
- a first electric interface which is positioned inside the opening of the second bottom wall and to which the other end of the first internal wiring is connected; and
- a first fluidic interface which is positioned inside the opening of the second bottom wall and to which the other end of the first internal tube is connected.

According to a second aspect of the present teaching, there is provided a head system including:

- a head unit having a head, the head having a nozzle; and
- the tank unit in accordance with the first aspect, connected to the head unit and configured to supply the ink to the head unit.

According to a third aspect of the present teaching, there is provided an ink supplying system including:

- an ink supplying device; and
- the tank unit in accordance with the first aspect, which is connected to the ink supplying device and to which the ink is supplied from the ink supplying device.

According to a fourth aspect of the present teaching, there is provided a printing system including:

- a head unit having a head, the head having a nozzle;
- the tank unit in accordance with the first aspect, connected to the head unit and configured to supply the ink to the head unit; and
- an ink supplying device connected to the tank unit and configured to supply the ink to the tank unit.

According to a fifth aspect of the present teaching, there is provided a printing method including:

- conveying a print medium by a conveyor; and
- causing the head system in accordance with the second aspect to discharge the ink onto the print medium conveyed by the conveyor.

According to a sixth aspect of the present teaching, there is provided a printing method including:

- conveying a print medium by a conveyor; and
- causing the printing system in accordance with the fourth aspect to discharge the ink onto the print medium conveyed by the conveyor.

According to the first to sixth aspects of the present teaching, it is possible to provide a tank unit of which degree of freedom of the placement location is improved, and to provide a head system, an ink supplying system, a printing system and a printing method each provided with such a tank unit.

In the following, an explanation will be given about an embodiment of a printing system according to the present teaching, with an ink-jet printer as an example.

Figure 1A:
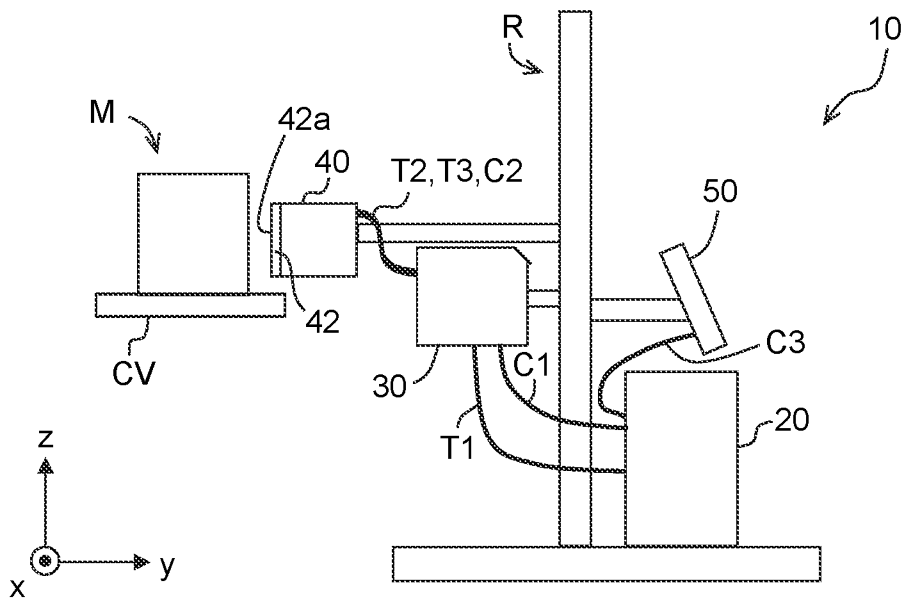
FIG. 1A is a view depicting a usage state of an ink-jet printer.
Figure 1B:
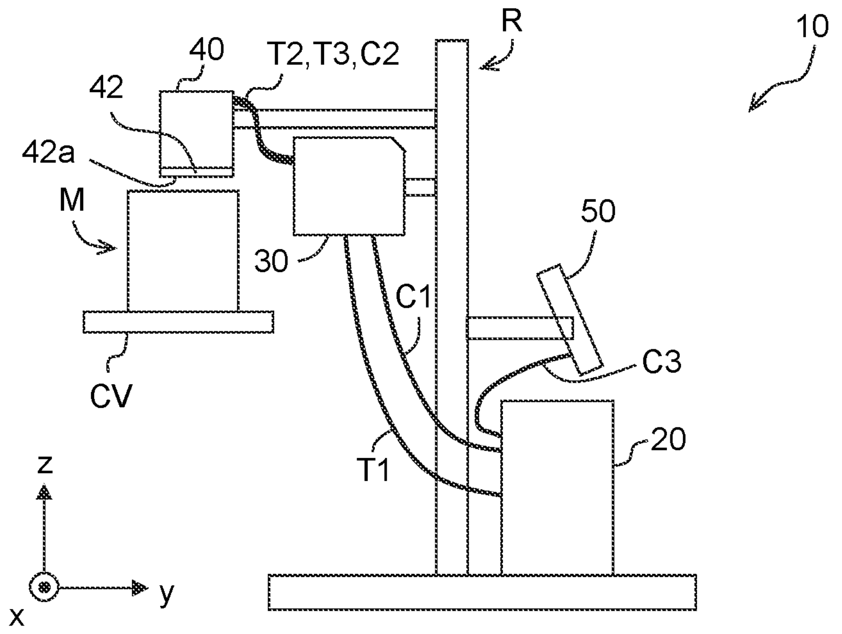
FIG. 1B is a view depicting another usage state of the ink-jet printer.

First, the overview of an ink-jet printer 10 will be explained, with reference to FIGS. 1A and 1B. Note that in the following explanation, a direction from a far side toward a front side of the sheet surface in FIGS. 1A and 1B is referred to as an x direction, a direction from the left side toward the right side of the sheet surface is referred to as a y direction, and a direction from the lower side toward the upper side of the sheet surface is referred to as a z direction. Namely, the x direction and the y direction are along a horizontal plane and are orthogonal to each other. The z direction is along the vertical direction and is orthogonal to the x direction and the y direction. Further, in each of the drawings, a side of a forward (tip) end of an arrow indicating the x direction is referred to as one side in the x direction, and a side of a base end of the arrow indicating the x direction is referred to as the other side of the x direction in some cases. A side of a forward end of an arrow indicating the y direction is referred to as one side in the y direction, and a side of a base end of the arrow indicating the y direction is referred to as the other side of the y direction in some cases. Further, a side of a forward end of an arrow indicating the z direction is referred to as one side in the z direction, and a side of a base end of the arrow indicating the z direction is referred to as the other side of the z direction in some cases.

As depicted in FIGS. 1A and 1B, the ink-jet printer 10 is mainly provided with a base unit 20, a tank unit 30, a head unit 40 and an operation panel 50. The base unit 20 and the tank unit 30 are connected by a tube T1 as an ink channel and a wiring cable C1. The tank unit 30 and the head unit 40 are connected by tubes T2 and T3 as the ink channel and a wiring cable C2. The operation panel 50 and the base unit 20 are connected by a wiring cable C3. The base unit 20, the tank unit 30, the head unit 40 and the operation panel 50 are fixed to a rack R to thereby have a relative positional relationship determined therefor.

The base unit 20 functions as an ink supplying device configured to supply an ink to the tank unit 30 via the tube T1. The tank unit 30 functions as a relaying device configured to supply the ink supplied from the base unit 20 to the head unit 40 via the tubes T2 and T3. Namely, the base unit 20 and the tank unit 30 function as an ink supplying system configured to supply the ink to the head unit 40. Further, the tank unit 30 and the head unit 40 function as a head system to which the ink is supplied from the base unit 20. The head unit 40 is provided with an ink-jet head 42, and a plurality of nozzles are formed in an ink discharge surface 42*a* of the ink-jet head 42. The ink-jet head 42 is configured to discharge or eject the ink, supplied from the tank unit 30, from the plurality of nozzles formed in the ink discharge surface 42*a*. As the ink-jet head 42, it is allowable to use, for example, a so-called piezoelectric ink-jet head provided with a plurality of nozzles, a plurality of individual channels each of which communicates with one of the plurality of nozzles, and a plurality of piezoelectric elements each of which applies a discharge pressure to the ink inside one of the plurality of individual channels.

In the present embodiment, the head unit 40 is configured to be attachable with respect to the rack R in a horizontal posture or a vertical posture. Here, the horizontal posture is a posture, as depicted in FIG. 1A, wherein the ink discharge surface 42*a* of the ink-jet head 42 is orthogonal to the y direction. In the horizontal posture, the ink is discharged from the ink discharge surface 42*a* in a horizontal direction (a direction opposite to the y direction). On the other hand, the vertical posture is a posture, as depicted in FIG. 1B, wherein the ink discharge surface 42*a* of the ink-jet head 42 is orthogonal to the z direction. In the vertical posture, the ink is discharged from the ink discharge surface 42*a* vertically downward (a direction opposite to the z direction). Here, it is presumed that a print medium M is conveyed in the x direction by a conveyor CV, as depicted in FIGS. 1A and 1B. In such a case, as depicted in FIG. 1A, by attaching the head unit 40 to the rack R in the horizontal posture, it is possible to perform printing on a side surface (side surface orthogonal to the horizontal plane) of the print medium M. On the other hand, by attaching the head unit 40 to the rack R in the vertical posture as depicted in FIG. 1B, it is possible to perform printing on an upper surface of the print medium M.

Figure 2:
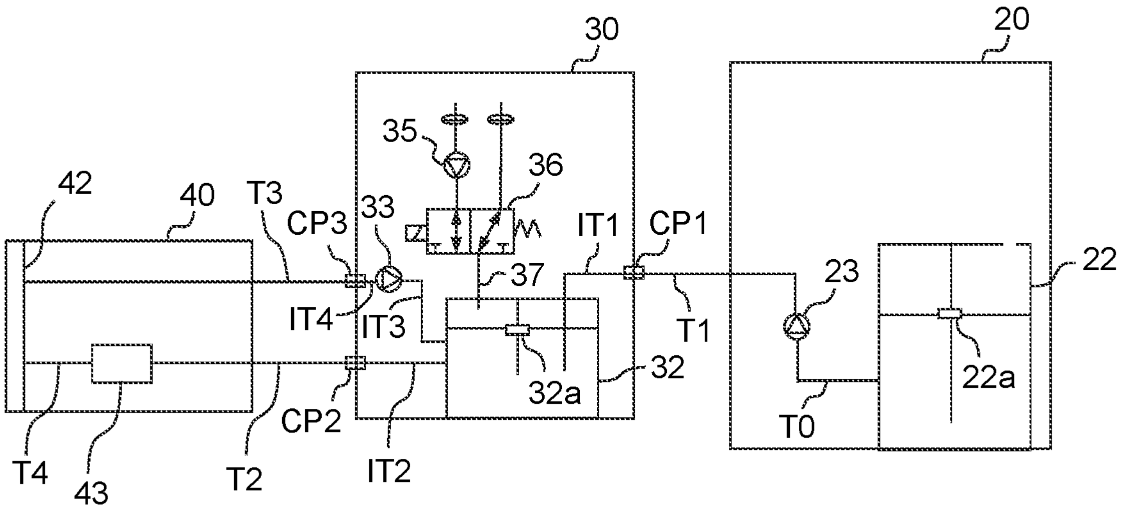
FIG. 2 is a view depicting the outline of an ink supplying system of the ink-jet printer.

Next, an ink supply system of the ink-jet printer 10 will explained. As depicted in FIG. 2, the base unit 20 is provided with a main tank 22 and a pump 23. The main tank 22 is installed inside the base unit 20. The main tank 22 is provided, for example, with a liquid level sensor 22*a* of a float type which is configured to detect the water level of the ink inside the main tank 22. Further, an atmosphere communicating hole is formed in the main tank 22, and the inside of the main tank 22 communicates with the atmosphere via the atmosphere communicating hole. Note that in the present embodiment, although the main tank 22 is installed inside the base unit 20, the main tank 22 may be configured to be detachable from the base unit 20 and exchangeable. Alternatively, it is also allowable to separately provide an exchangeable ink tank configured to communicate with the main tank 22 and to supply the ink to the main tank 22.

The tank unit 30 is provided with a head tank 32, a circulation pump 33, a purge pump 35, a solenoid valve 36 and an atmosphere communicating channel 37. The head tank 32 is installed inside the tank unit 30. The head tank 32 is provided, for example, with a liquid level sensor 32*a* of a float type which is configured to detect the water level of the ink inside the head tank 32. The atmosphere communicating channel 37 is provided with the purge pump 35 and the solenoid valve 36. Although the solenoid valve 36 normally allows the head tank 32 to communicate with the atmosphere, the solenoid valve 36 shuts off the communication between the head tank 32 and the atmosphere during a purge processing (to be described later on), and allows the head tank 32 and the purge pump 35 to communicate with each other. Accordingly, the head tank 32 communicates with the atmosphere, except for a period of time during which the purge processing is being executed.

The head unit 40 is provided with the ink-jet head 42 and a damper 43. The damper 43 is provided, for example, in order to mitigate any variation in pressure in the ink inside the ink-jet head 42 which occurs, for example, in such a case that a print medium conveyed by the conveyor skews and collides against the ink-jet head 42, etc.

The main tank 22 and the head tank 32 communicate with each other via a tube T0, a tube T1 and a tube IT1. One end of the tube T0 is connected to the main tank 22, and the other end of the tube T0 is connected to the pump 23. One end of the tube T1 is connected to the pump 23, and the other end of the tube T1 is connected to a coupler CP1 of the tank unit 30. Further, one end of the tube IT1 is connected to the coupler CP1 of the tank unit 30, and the other end of the tube IT1 is connected to the head tank 32.

The head tank 32 and the damper 43 of the head unit 40 communicate with each other via a tube IT2 and a tube T2. One end of the tube IT2 is connected to the head tank 32, and the other end of the tube IT2 is connected to a coupler CP2 of the tank unit 30. Further, one end of the tube T2 is connected to the coupler CP2 of the tank unit 30 and the other end of the tube T2 is connected to the damper 43.

The damper 43 and the ink-jet head 42 of the head unit 40 communicate with each other via a tube T4. Namely, one end of the tube T4 is connected to the damper 43 and the other end of the tube T4 is connected to the ink-jet head 42. Further, the ink-jet head 42 and the head tank 32 communicate with each other via a tube T3, a tube IT4 and a tube IT3. One end of the tube T3 is connected to the ink-jet head 42, and the other end of the tube T3 is connected to a coupler CP3 of the tank unit 30. One end of the tube IT4 is connected to the coupler CP3 of the tank unit 30, and the other end of the tube IT4 is connected to the circulation pump 33 of the tank unit 30. Further, one end of the tube IT3 is connected to the circulation pump 33 of the tank unit 30, and the other end of the tube IT3 is connected to the head tank 32.

At a time of initially introducing (installing) the ink-jet printer 10, the ink is not present inside the head tank 32 and inside the ink-jet head 42. Accordingly, at first, a controller 21 (to be described later on, see FIG. 3) drives the pump 23 so as to supply the ink from the main tank 22 to the head tank 32 via the tubes T0, T1 and IT1. Further, in a case that the liquid level sensor 32*a* of the head tank 32 detects that the water level of the ink inside the head tank 32 has reached an upper limit, the controller 21 stopes the pump 23. With this, the supply of the ink to the head tank 32 is stopped. Next, in a state that the ink discharge surface 42*a* of the ink-jet head 42 is covered by a non-illustrated cap, the controller 21 drives the circulation pump 33 via a relay substrate 31 (to be described later on; see FIG. 3) of the tank unit 30. With this, the ink flows in an order of: the tube IT2, the tube T2, the tube T4, the ink-jet head 42, the tube T3, the tube IT4, and the tube IT3, whereby the ink is filled in the ink-jet head 42 and in a channel connecting the ink-jet head 42 and the head tank 32. In a case that the ink is filled in the ink-jet head 42 and in the channel connecting the ink-jet head 42 and the head tank 32, the controller 21 stopes the circulation pump 33 via the relay substrate 31. With this, the supply of the ink to the ink-jet head 42 is stopped.

In a case that the ink is discharged or ejected from the ink-jet head 42 in a state that the ink is filled in the ink-jet head 42 and in the channel connecting the ink-jet head 42 and the head tank 32, an amount, of the ink, which is same as the amount of the ink discharged from the ink-jet head 42 is supplied from the head tank 32 to the ink-jet head 42 via the tubes IT2, T2 and T4. Then, in a case that the ink inside the head tank 32 is decreased by continuous discharge of the ink from the ink-jet head 42 and that the liquid level sensor 32*a* of the head tank 32 detects that the water level of the ink inside the head tank 32 has reached a lower limit, the controller 21 drives the pump 23. With this, the ink is supplied from the main tank 22 to the head tank 32 via the tubes T0, T1 and IT1. In a case that the ink inside the main tank 22 is decreased by supplying of the ink to the head tank 32 and that the liquid level sensor 22*a* of the main tank 22 detects that the water level of the ink inside the main tank 22 has reached a lower limit, the controller 21 causes, for example, the operation panel 50 to display a message urging replenishing of the ink with respect to the main tank 22. Then, a user, who has seen the message urging the replenishing of the ink with respect to the main tank 22 replenishes the main tank 22 with the ink, thereby making it possible to supply the ink from the main tank 22 to the head tank 32 again.

Note that in the present embodiment, in order to exhaust (discharge), from the plurality of nozzles of the ink discharge surface 42*a*, a viscous ink inside the ink-jet head 42, or an air bubble entered into and mixed with the ink inside the ink-jet head 42 and inside the tubes IT2, T2 and T4, the controller 21 executes, in some cases, a purge processing of forcibly supplying the ink from the head tank 32 to the ink-jet head 42. In the purge processing, the controller 21 controls the solenoid valve 36 so as to shut off the communication between the head tank 32 and the atmosphere and to allow the head tank 32 to communicate with the pure pump 35. Further, the control 21 drives the purge pump 35 via the relay substrate 31 in this state, to thereby make the pressure inside the head tank 32 to be in the positive pressure. By doing so, the ink is forcibly supplied from the head tank 32 to the ink-jet head 42 via the tube IT2, T2 and T4, thereby exhausting the viscous ink and/or the air bubble inside the ink-jet head 42 from the plurality of nozzles.

Figure 3:
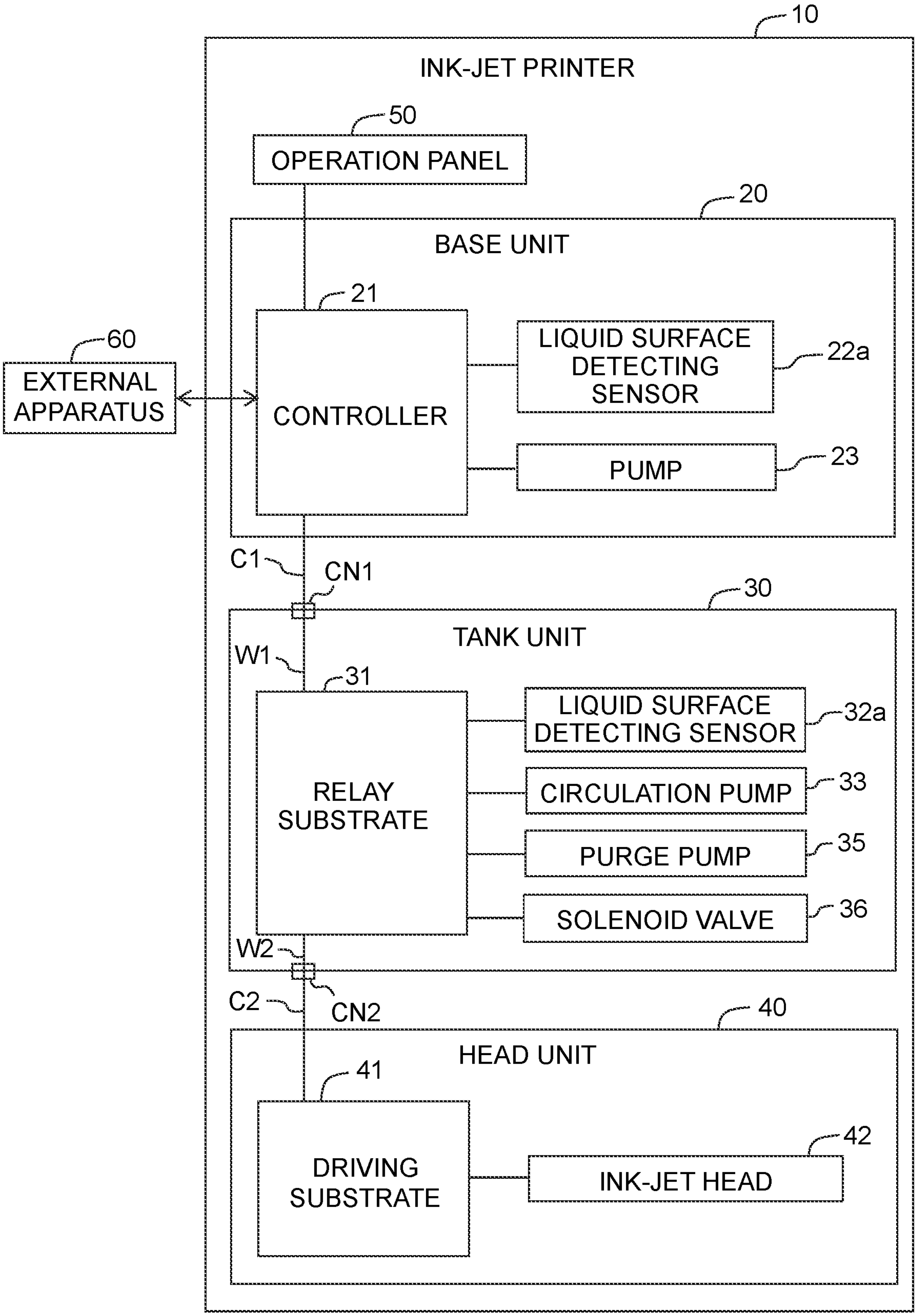
FIG. 3 is a view depicting the outline of the electrical connection among a base unit, a tank unit, a head unit, an operation panel and an external apparatus.

Next, an explanation will be given about the electric connecting relationship among the base unit 20, the tank unit 30, the head unit 40 and the operation panel 50. As depicted in FIG. 3, the base unit 20 is provided with the controller 21; the controller 21 is electrically connected to the liquid level sensor 22*a* and the pump 23. Further, the controller 21 is electrically connected to the operation panel 50 as an input-output interface with respect to a user. The tank unit 30 is provided with the relay substrate 31; the relay substrate 31 is electrically connected to the liquid level sensor 32*a*, the circulation pump 33, the purge pump 35 and the solenoid valve 36. Further, the relay substrate 31 is electrically connected to the controller 21 of the base unit 20 via a wiring cable W1 and the wiring cable C1. One end of the wiring cable W1 is connected to the relay substrate 31, and the other end of the wiring cable W1 is connected to a connector CN1 of the tank unit 30. Further, one end of the wiring cable C1 is connected to the connector C1 of the tank unit 30, and the other end of the wiring cable CN1 is connected to the controller 21. The head unit 40 is provided with a driving substrate 41; the driving substrate 41 is electrically connected to ink-jet head 42. Further, the relay substrate 31 of the tank unit 30 and the driving substrate 41 are electrically connected to each other via a wiring cable W2 and the wiring cable C2. One end of the wiring cable W2 is connected to the relay substrate 31, and the other end of the wiring cable W2 is connected to a connector CN2 of the tank unit 30. Further, one end of the wiring cable C2 is connected to the connector CN2 of the tank unit 30, and the other end of the wiring cable C2 is connected to the driving substrate 41.

The controller 21 is provided with a CPU (Central Processing Unit), a ROM (Read Only Memory), a RAM (Random Access Memory) and an ASIC (Application Specific Integrated Circuit) which includes a variety of kinds of control circuits, etc. The controller 21 executes a variety of kinds of processing in accordance with a program stored in the ROM and by the CPU and the ASIC. For example, the controller 21 generates a control signal based on a print job received from an external apparatus 60 such as a PC, etc., and transmits the control signal to the driving substrate 41 via the relay substrate 31. Further, the driving substrate 41 generates a driving signal based on the control signal, and drives the ink-jet head 42 based on the driving signal, thereby executing a print processing of printing an image, etc., on the print medium M. Furthermore, the controller 21 controls the pumps 23 and 33, the purge pump 35, the solenoid valve 36, the operation panel 50, etc., based on signals each of which is outputted from one of the liquid level sensors 22*a* and 32*a*, thereby executing a supply processing of the ink and a maintenance processing with respect to the ink-jet head 42. Note that although the example in which the controller 21 performs the print processing by the CPU and the ASIC has been explained, the present teaching is not limited to or restricted by this. It is allowable to realize the controller 21 by any hardware configuration. For example, it is allowable that the processing is executed by the CPU only or the ASIC only. Alternatively, it is allowable to realize the function of the controller 21 in a divided manner by two or more pieces of the CPU and/or two or more pieces of the ASIC.

Figure 4A:
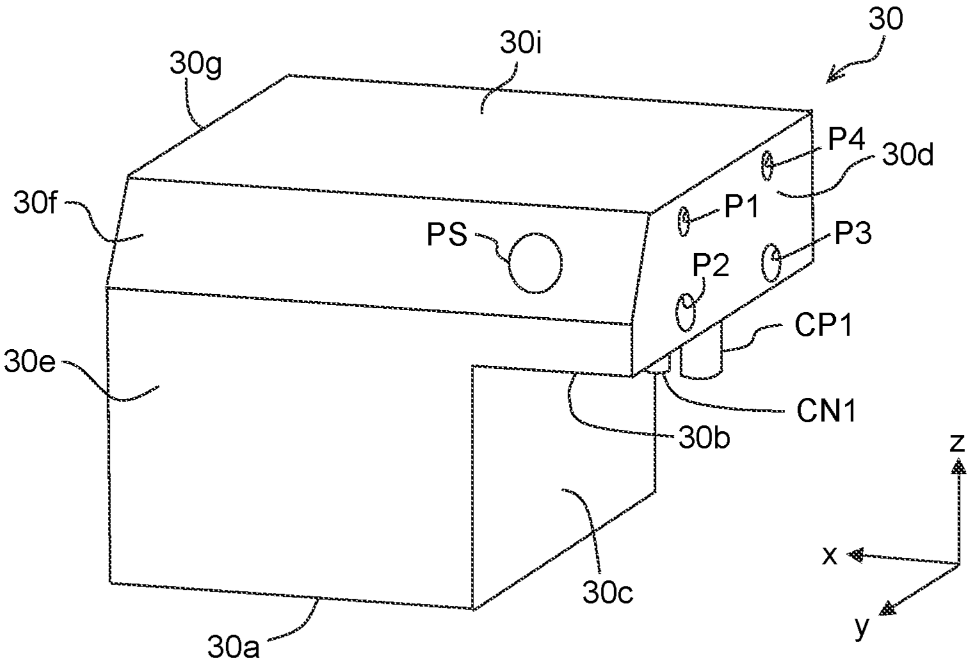
FIG. 4A is a perspective view of the tank unit.
Figure 4B:
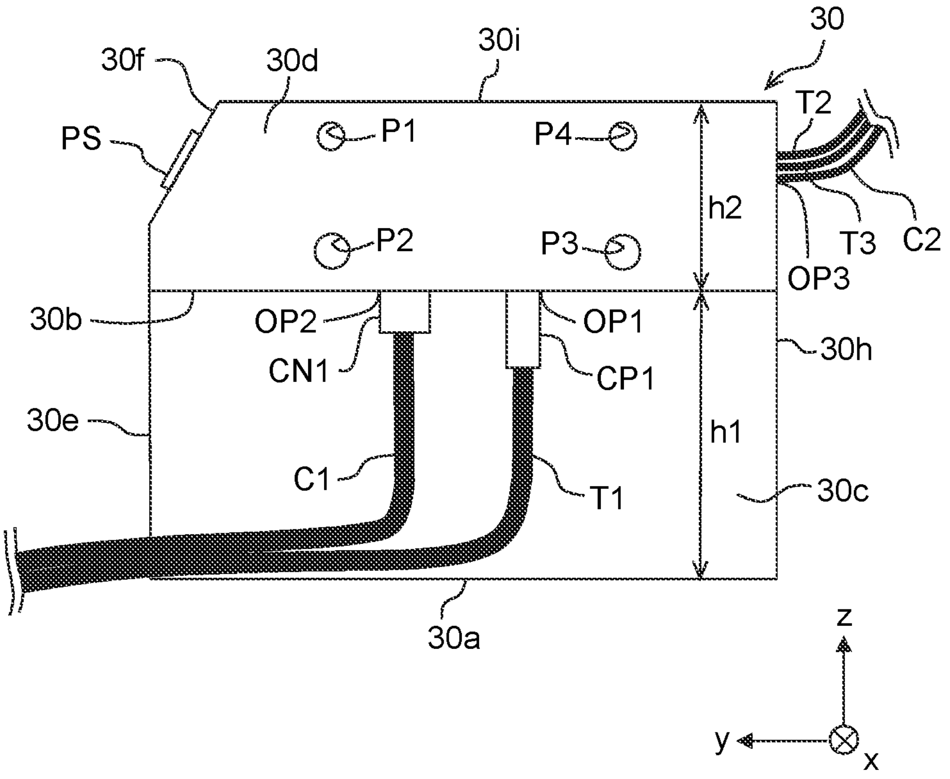
FIG. 4B is a side view of the tank unit.

Next, the details of the tank unit 30 will be explained, with reference to FIGS. 4A to 4D. As depicted in FIGS. 4A and 4B, the tank unit 30 has a bottom wall 30*a*, a bottom wall 30*b*, a side wall 30*c*, a side wall 30*d*, a side wall 30*e*, an inclined wall 30*f*, a side wall 30*g*, a side wall 30*h* and an upper wall 30*i*. Note that in FIG. 4C, in order to depict the internal configuration of the tank unit 30, the upper wall 30*i*, the inclined wall 30*f*, the side wall 30*e* and the side wall 30*g* are omitted from the illustration. Further, in FIG. 4D, in order to depict the internal configuration of the tank unit 30, the side wall 30*e* and the inclined wall 30*f* are omitted from the illustration.

The bottom walls 30*a*, 30*b* and the upper wall 30*i* each have a rectangular outer shape spreading or expanding in the x direction and the y direction. The bottom wall 30*b* is positioned on the one side in the z direction with respect to the bottom wall 30*a* (the upper side in FIG. 4A), and the upper wall 30*i* is positioned on the one side in the z direction with respect to the bottom wall 30*b*.

The side wall 30*c* has a rectangular outer shape spreading in the y direction and the z direction. An end part on the one side in the z direction (the upper side in FIG. 4A) of the side wall 30*c* is connected to an end part on the one side in the x direction (the left side in FIG. 4A) of the bottom wall 30*b*. An end part on the other side in the z direction (the lower side in FIG. 4A) of the side wall 30*c* is connected to an end part on the other side in the x direction (the right side in FIG. 4A) of the bottom wall 30*a*.

The side walls 30*d* and 30*g* each have a pentagonal shape which are parallel to a yz plane. An end part on the other side in the z direction (the lower side in FIG. 4A) of the side wall 30*d* is connected to an end part on the other side in the x direction of the bottom wall 30*b*. An end part on the one side in the z direction of the side wall 30*d* is connected to an end part on the other side in the x direction of the upper wall 30*i*. An end part on the other side in the z direction (the lower side in FIG. 4A) of the side wall 30*g* is connected to an end part on the one side in the x direction of the bottom wall 30*a*. An end part on the one side in the z direction of the side wall 30*g* is connected to an end part on the one side in the x direction of the upper wall 30*i*.

The side walls 30*e* and 30*h* each have a hexagonal outer shape spreading in the x direction and the z direction. The side wall 30*e* is connected to the bottom walls 30*a* and 30*b*, an end part on the one side in the y direction (the front side in FIG. 4A) of the side wall 30*c*, and a part, of an end part on the one side in they direction of each of the side walls 30*d* and 30*g*, which is parallel to the z direction. The side wall 30*h* is connected to an end part in the other side in the y direction (the far (rear) side in FIG. 4A) of each of the bottom walls 30*a* and 30*b*, and an end part on the other side in they direction of each of the side walls 30*c*, 30*d* and 30*g*.

The inclined wall 30*f* has a rectangular outer shape, and is inclined with respect to the plane spreading in the x direction and the z direction. The inclined wall 30*f* is connected to an end part on the one side in the z direction of the side wall 30*e*, an end part on the one side in the y direction of the upper wall 30*i*, an inclined part, of an end part on the one side in the y direction of the side wall 30*d*, which is inclined with respect to the z direction, and an inclined part, of an end part on the one side in they direction of the side wall 30*g*, which is inclined with respect to the z direction.

Figure 4C:
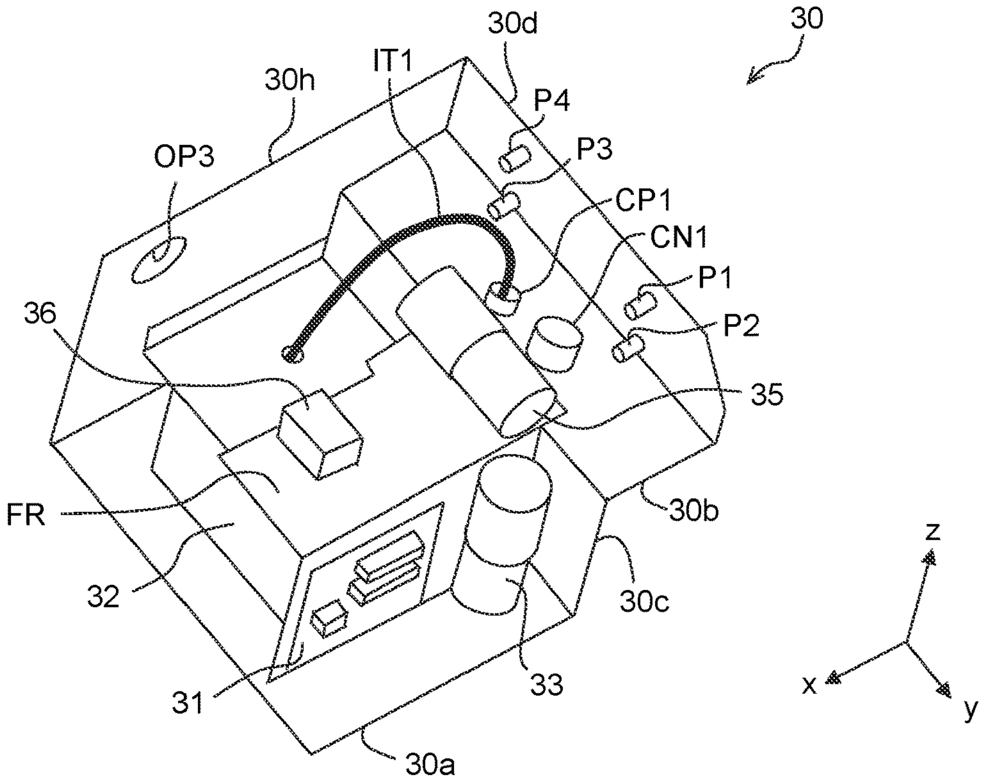
FIG. 4C is a perspective view depicting the internal configuration of the tank unit.

As depicted in FIG. 4C, the head tank 32, the relay substrate 31 and the circulation pump 33 are arranged on a surface on the one side in the z direction of the bottom wall 30*a*. The tubes IT1 and IT2 (see FIG. 2) and the tube IT3 (see FIG. 2) are connected to the head tank 32. Further, an end of the atmosphere communicating channel 37 (see FIG. 2) which extends in the z direction is connected to an end part on the one side in the z direction of the head tank 32, and the other end of the atmosphere communicating channel 37 is connected to another opening which is formed in the bottom wall 30*b* and which is different from openings OP1 and OP2. The relay substrate 31 has a rectangular outer shape spreading in the x direction and the z direction, and is positioned, in the y direction, between the head tank 32 and the side wall 30*e*. Further, the circulation pump 33 is also positioned, in the y direction, between the head tank 32 and the side wall 30*e*.

Figure 4D:
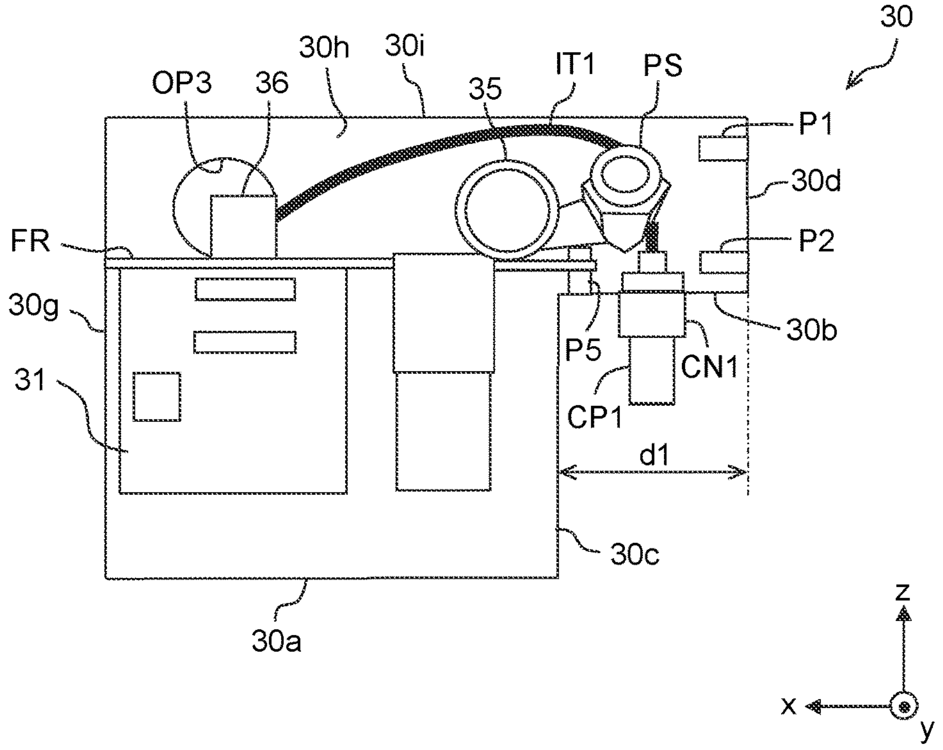
FIG. 4D is a front view depicting the internal configuration of the tank unit.

As depicted in FIG. 4B, the two openings OP1 and OP2 penetrating the bottom wall 30*b* in the z direction are formed in the bottom wall 30*b*. The coupler CP1 is positioned inside the opening OP1. One end of the coupler CP1 protrudes from the opening OP1 in the direction opposite to the z direction. The tube T1 is connected to the one end of the coupler CP1. Further, as depicted in FIG. 4C, the tube IT1 is connected to the other end of the coupler CP1. The connector CN1 is positioned inside the opening CP2. As depicted in FIG. 4B, one end of the connector CN1 protrudes in the direction opposite to the z direction. The wiring cable C1 is connected to the one end of the connector CN1. Further, the wiring cable W1 (see FIG. 3) is connected to the other end of the connector CN1. As depicted in FIGS. 4B and 4D, the coupler CP1 and the connector CN1 are arranged side by side in the y direction. Furthermore, as depicted in FIG. 4B, a length h1 in the z direction of the side wall 30*c*, in other words, a spacing distance in the z direction between the bottom wall 30*a* and the bottom wall 30*b* is greater than the minimum bending radius of the tube T1 connectable to the one end of the coupler CP1, and is greater than the minimum bending radius of the wiring cable C1 connectable to the one end of the connector CN1.

As depicted in FIGS. 4A to 4D, in the wide wall 30*d*, end parts of cylindrical parts P1 to P4, respectively, which extend in the x direction from the side wall 30*d* are opened. In other words, the four openings and the four cylindrical parts P1 to P4 extending from the four openings, respectively, in the x direction are formed in the side wall 30*d*. A female screw is formed inside each of the four cylindrical parts P1 to P4, and a male screw configured to fix the tank unit 30 to the rack R is inserted into each of the four cylindrical parts P1 to P4. As depicted in FIG. 4D, a length in the x direction of each of the four cylindrical parts P1 to P4 is shorter than a length d1 in the x direction of the bottom wall 30*b* (see FIG. 4D). In other words, the length d1 in the x direction of the bottom wall 30*b* is longer than the length in the x direction of each of the four cylindrical parts P1 to P4. Further, a length h2 in the z direction of the side wall 30*d* (see FIG. 4B), in other words, a spacing distance in the z direction from the bottom wall 30*b* to the upper wall 30*i*, is greater than the minimum bending radius of the tube IT1 connected to the other end of the coupler CP1.

As depicted in FIGS. 4A and 4B, a purge switch PS is provided, in the inclined wall 30*f*, on an area thereof on the one side in the z direction with respect to the bottom wall 30*b*, in other words, on the area overlapping with the bottom wall 30*b* in the z direction. In a case that the user presses or pushes the purge switch PS, the purge processing as described above is executed. Note that as depicted in FIGS. 4A and 4D, a length in the x direction of the purge switch PS is shorter than the length d1 in the x direction of the bottom wall 30*b*. In other words, the length d1 in the x direction of the bottom wall 30*b* is longer than the length in the x direction of the purge switch PS. Further, as depicted in FIG. 4D, the length d1 in the x direction of the bottom wall 30*b* is longer than a sum of the length in the x direction of the cylindrical part P1 and the length in the x direction of the purge switch PS, and is longer than a sum of the length in the x direction of the cylindrical part P2 and the length in the x direction of the purge switch PS.

As depicted in FIGS. 4B and 4C, an opening OP3 is formed in the side wall 30*h*. Further, the couplers CP2 and CP3 (see FIG. 2) and the connector CN2 (see FIG. 3) are provided inside the opening OP3. The tube IT2 (see FIG. 2) is connected to one end of the coupler CP2, and the tube T2 (see FIG. 2) is connected to the other end of the coupler CP2. The tube IT4 (see FIG. 2) is connected to one end of the coupler CP3, and the tube T3 (see FIG. 2) is connected to the other end of the coupler CP3. Further, the wiring cable W2 (see FIG. 3) is connected to one end of the connector CN2, and the wiring cable C2 (see FIG. 3) is connected to the other end of the connector CN2.

As depicted In FIG. 4C, a reinforcing frame FR spreading in the x direction and the y direction is provided inside the tank unit 30. As depicted in FIG. 4D, a cylindrical part P5 extending in the z direction is formed in the bottom wall 30*b*; the reinforcing frame FR is fixed to the one side in the z direction with respect to the head tank 32, by a screw inserted into the inside of the cylindrical part P5. Further, as depicted in FIGS. 4C and 4D, the purge pump 35, the solenoid valve 36, etc., are arranged on a surface on the one side in the z direction of the reinforcing frame FR. The purge pump 35 is positioned, in the x direction, between an end part on the one side in the x direction of the bottom wall 30*b* and the atmosphere communicating channel 37 (see FIG. 2) extending in the z direction. Furthermore, as depicted in FIG. 4D, the length d1 in the x direction of the bottom wall 30*b* is longer than a sum of the length in the x direction of the cylindrical part P1, the length in the x direction of the purge switch PS and a length in the x direction of the cylindrical part P5, and is longer than a sum of a length in the x direction of the cylindrical part P2, the length in the x direction of the purge switch PS and the length in the x direction of the cylindrical part P5.

In the tank unit 30 of the present embodiment as explained above, the x direction, the y direction and the z direction are examples, respectively, of a "first direction", a "second direction" and a "vertical direction". The bottom wall 30*a* and the bottom wall 30*b* are examples, respectively, of a "first bottom wall" and a "second bottom wall". The side wall 30*c* and the side wall 30*d* are examples, respectively, of a "first side wall" and "second side wall". The side wall 30*e* and the inclined wall 30*f* are an example of a "third side wall", and the side wall 30*h* is an example of a "fourth side wall". The head tank 32 is an example of a "tank", and the relay substrate 31 is an example of a "substrate". The tubes IT1, T1 and IT2 are examples, respectively, of a "first internal tube", a "first external tube" and a "second internal tube", and the coupler CP1 and CP2 are examples, respectively, of a "first fluidic interface" and a "second fluidic interface". The wiring cables W1, C1 and W2 are examples, respectively, of a "first internal wiring", a "first external wiring" and a "second internal wiring", and the connectors CN1 and CN2 are examples, respectively, of a "first electric interface" and a "second electric interface". The cylindrical parts P1 to P4 are an example of a "first cylindrical part" and the cylindrical part P5 is an example of a "second cylindrical part".

In the tank unit 30 as explained above, the one end of the coupler CP1 and the one end of the connector CN1 protrude, respectively, from the opening OP1 and the opening OP2 of the bottom wall 30*b* to the other side in the z direction, and the tube T1 and the wiring cable C1 are connected, respectively, to the one end of the coupler CP1 and the one end of the connector CN1. Further, the length h1 in the z direction of the side wall 30*c*, in other words, the spacing distance between the bottom wall 30*a* and the bottom wall 30*b* is greater than the minimum bending radius of the tube T1 connected to the one end of the coupler CP1, and is greater than the minimum bending radius of the wiring cable C1 connected to the one end of the connector CN1. Accordingly, for example, even in such a case that the tank unit 30 is arranged in a state that the bottom wall 30*a* is placed on the horizontal plane, it is possible to route, along the horizontal plane, the tube T1 and the wiring cable C1 extending, respectively, from the coupler CP1 and the connector CN1 to the other side in the z direction, while bending the tube T1 and the wiring cable C1 without breaking or damaging the tube T1 and the writing cable C1. Namely, it is possible to improve the degree of freedom of the placement location of the tank unit 30.

Further, for example, depending on the placement location of the tank unit 30, such a case is conceivable that any obstacle such as a wall, etc., is present on the other side in the x direction with respect to the tank unit 30. Alternatively, such a case is conceivable that, in a state that a jig, etc., is placed with respect to the side wall 30*d* of the tank unit 30, a screw is inserted into any one of the cylindrical parts P1 to P4 to thereby fix the tank unit 30 to the jig. In either of the above-described cases, the user is unable to access the coupler CP1 and the connector CN1 from the other side in the x direction. In view of this, in the present embodiment, the one end of the coupler CP1 and the one end of the connector CN1 protrude, respectively, from the opening OP1 and the opening OP2 of the bottom wall 30*b* to the other side in the z direction. Accordingly, even in the above-described case that the user is unable to access the coupler CP1 and the connector CN1 from the other side in the x direction, the user is able to access the coupler CP1 and the connector CN1 from the one side in the y direction or from the other side in they direction, and to connect the tube T1 and the wiring cable C1, respectively, to the coupler CP1 and the coupler CP2. Furthermore, even in a case that any space for routing the tube T1 and/or the wiring cable C1 is not present on the other side in the x direction with respect to the side wall 30*d* of the tank unit 30 due to such a restriction in the placement location, it is possible to route the tube T1 and/or the wiring cable C1 along the yz plane. Namely, it is possible to improve the degree of freedom of the placement location of the tank unit 30.

Furthermore, the other end of the coupler CP1 is positioned on the one side in the z direction from (with respect to) the bottom wall 30*b*, and the length h2 in the z direction of the side wall 30*d*, in other words, the spacing distance from the bottom wall 30*b* to the upper wall 30*i* is greater than the minimum bending radius of the tube IT1 connected to the other end of the coupler CP1. Accordingly, it is possible to route the tube IT1 inside the tank unit 30, while bending the tube IT1 without breaking or damaging the tube IT1.

In the tank unit 30 of the present embodiment, it is possible to suppress the size in the z direction of the tank unit 30 to be minimally required, by suppressing the length h2 in the z direction of the side wall 30*d* to be minimally required within a range which is greater than the minimum bending radius of the tube IT1, while suppressing the length h1 in the z direction of the side wall 30*c* within a range greater than the minimum bending radius of the tube T1 and the minimum bending radius of the wiring cable C1.

Further, in the tank unit 30 of the present embodiment, it is possible to suppress the size in the z direction of the tank unit 30 to be minimally required, by suppressing the length d1 in the x direction of the bottom wall 30*b* within a range longer than the sum of the length in the x direction of the cylindrical part P1, the length in the x direction of the purge switch PS and the length in the x direction of the cylindrical part P5.

In the tank unit 30 of the present embodiment, the coupler CP1 and the connector CN1 are arranged side by side in the y direction in the bottom wall 30*b*. Accordingly, it is possible to suppress the size in the x direction of the bottom wall 30*b* to be minimally required, which in turn makes it possible to suppress the size in the x direction of the tank unit 30 to be minimally required, as a result.

Inside the tank unit 30 of the present embodiment, the reinforcing frame FR is provided on the one side in the z direction with respect to the head tank 32. Further, the purge pump 35 is arranged in the surface, of the reinforcing frame FR, which is on the one side in the z direction; the purge pump 35 is positioned, in the x direction, between the end part on the one side in the x direction of the bottom wall 30*b* and the atmosphere communicating channel 37 extending to the one side in the z direction. With this, it is possible to effectively use the space which is inside the tank unit 30 and which is on the one side in the z direction with respect to the head tank 32, thereby making it possible suppress any increase in the size of the tank unit 30.

Although the embodiment of the present teaching has been explained in the foregoing, the present teaching is not limited to or restricted by the above-described embodiment, and various design changes can be made within the scope of the claims.

In the above-described embodiment, the openings OP1 and OP2 are formed in the bottom wall 30*b*, and the one end of the coupler CP1 protrudes from the opening OP1, and the one end of the connector CN1 protrudes from the opening OP2. The present teaching, however, is not limited to or restricted by this. For example, it is allowable that the one end of the coupler CP1 and the one end of the connector CN1 protrude from one opening formed in the bottom wall 30*b*. Alternatively, it is allowable that the other end of the atmosphere communicating channel 37 is connected to the one opening.

In the above-described embodiment, the coupler CP1 and the connector CN1 are arranged side by side in the y direction in the bottom wall 30*b*. The present teaching, however, is not limited to this. For example, in a case that wall, etc., is present on the other side in the x direction with respect to the tank unit 30, and that the user accesses the coupler CP1 and the connector CN1 from the one side in the y direction or from the other side in the y direction so as to connect the tube T1 and the wiring cabler C1, respectively, to the coupler CP1 and the connector CN1, it is allowable to arrange the coupler CP1 and the connector CN1 to be shifted from each other in the x direction. By doing so, the user is allowed to access the coupler CP1 and the connector CN1 more easily.

In the above-described embodiment, the liquid level sensors 22*a* and 32*a* of the float type are used as the liquid level sensors configured to detect, respectively, the ink amount in the main tank 22 and the ink amount in the head tank 32. The present teaching, however, is not limited to this. For example, it is allowable to use an optical sensor provided with a light projecting part and a light receiving part.

What is claimed is:

1. A tank unit comprising:

a first bottom wall spreading in a first direction and a second direction, the first direction being along a horizontal plane, the second direction being along the horizontal plane and crossing the first direction;

a second bottom wall positioned above the first bottom wall and spreading in the first direction and the second direction, the second bottom wall defining an opening penetrating therethrough in a vertical direction;

a first side wall spreading in the vertical direction and the second direction, the first side wall having an upper end part and a lower end part, the upper end part being connected to an end part on one side in the first direction of the second bottom wall, the lower end part being connected to an end part on the other side in the first direction of the first bottom wall;

a tank arranged on an upper surface of the first bottom wall and which is configured to store ink;

a liquid level sensor configured to detect a liquid level of the ink inside the tank;

a substrate electrically connected to the liquid level sensor;

a first internal wiring having one end connected to the substrate;

a first internal tube which has one end connected to the tank and through which the ink to be supplied to the tank flows;

a first electric interface which is positioned inside the opening of the second bottom wall and to which the other end of the first internal wiring is connected; and a first fluidic interface which is positioned inside the opening of the second bottom wall and to which the other end of the first internal tube is connected.

2. The tank unit according to claim 1, wherein a length in the vertical direction of the first side wall is greater than a minimum bending radius of a first external wiring to be connected to the first electric interface, and is greater than a minimum bending radius of a first external tube to be connected to the first fluidic interface.

3. The tank unit according to claim 1, further comprising a second side wall spreading in the vertical direction and the second direction, the second side wall having a lower end part connected to an end part on the other side in the first direction of the second bottom wall, wherein a length in the vertical direction of the second side wall is greater than a minimum bending radius of the first internal tube connected to the first fluidic interface.

4. The tank unit according to claim 3, wherein the second side wall has a first cylindrical part extending from the second side wall to the one side in the first direction, and a length in the first direction of the second bottom wall is longer than a length in the first direction of the first cylindrical part.

5. The tank unit according to claim 4, further comprising:

a third side wall connected to an end part on the one side in the second direction of the first bottom wall, an end part on the one side in the second direction of the first side wall, an end part on the one side in the second direction of the second bottom wall and an end part on the one side in the second direction of the second side wall; and a fourth side wall spreading in the vertical direction and the first direction, the fourth side wall being connected to an end part on the other side in the second direction of the first bottom wall, an end part on the other side in the second direction of the first side wall, an end part on the other side in the second direction of the second bottom wall and an end part on the other side in the second direction of the second side wall, wherein in the third side wall, a switch is positioned at a location above the second bottom wall, and the length in the first direction of the second bottom wall is longer than a length in the first direction of the switch.

6. The tank unit according to claim 5, wherein the length in the first direction of the second bottom wall is longer than a sum of the length in the first direction of the switch and the length in the first direction of the first cylindrical part.

7. The tank unit according to claim 6, wherein the second bottom wall has a second cylindrical part extending upward from the second bottom wall, and a length in the first direction of the second bottom wall is longer than a sum of the length in the first direction of the switch, the length in the first direction of the first cylindrical part and the length in the first direction of the second cylindrical part.

8. The tank unit according to claim 5, further comprising:

a second internal tube which has one end connected to the tank and through which the ink flowed out from the tank flows; and a second fluidic interface to which the other end of the second internal tube is connected, wherein the fourth side wall defines an opening penetrating the fourth side wall in the second direction, and the second fluidic interface is positioned inside the opening of the fourth side wall.

9. The tank unit according to claim 8, further comprising:

a second internal wiring having one end connected to the substrate; and a second electric interface to which the other end of the second internal wiring is connected, wherein the second electric interface is positioned inside the opening of the fourth side wall.

10. The tank unit according to claim 9, wherein the substrate spreads in the first direction and the vertical direction, and in the second direction, the substate is positioned between the tank and the third side wall.

11. The tank unit according to claim 8, further comprising:

an atmosphere communicating channel extending upward from the tank and having a valve which is configured to release pressure inside the tank to atmosphere;

a purge pump provided on the atmosphere communicating channel; and a reinforcing frame arranged above the second bottom wall and spreading in the first direction and the second direction, wherein the purge pump is positioned on an upper surface of the reinforcing frame, and is positioned in the first direction between the end part on the one side in the first direction of the second bottom wall and the atmosphere communicating channel.

12. The tank unit according to claim 11, wherein the second bottom wall further defines another opening penetrating the second bottom wall in the vertical direction, one end of the atmosphere communicating channel is connected to the tank, and the other end of the atmosphere communicating channel is connected to the another opening of the second bottom wall.

13. The tank unit according to claim 5, wherein the first electric interface and the first fluidic interface project downward from the opening of the second bottom wall, and the first electric interface and the first fluidic interface are arranged side by side in the second direction.

14. A head system comprising:

a head unit having a head, the head having a nozzle; and the tank unit as defined in claim 1, connected to the head unit and configured to supply the ink to the head unit.

15. A printing method comprising:

conveying a print medium by a conveyor; and causing the head system as defined in claim 14 to discharge the ink onto the print medium conveyed by the conveyor.

16. An ink supplying system comprising:

an ink supplying device; and the tank unit as defined in claim 1, which is connected to the ink supplying device and to which the ink is supplied from the ink supplying device.

17. A printing system comprising:

a head unit having a head, the head having a nozzle;

the tank unit as defined in claim 1, connected to the head unit and configured to supply the ink to the head unit; and an ink supplying device connected to the tank unit and configured to supply the ink to the tank unit.

18. A printing method comprising:

conveying a print medium by a conveyor; and causing the printing system as defined in claim 17 to discharge the ink onto the print medium conveyed by the conveyor.

* * * * *